United States Patent
Hsieh et al.

(10) Patent No.: US 9,930,361 B2
(45) Date of Patent: Mar. 27, 2018

(54) APPARATUS FOR DYNAMICALLY ADJUSTING VIDEO DECODING COMPLEXITY, AND ASSOCIATED METHOD

(71) Applicant: MEDIATEK INC., Hsin-Chu (TW)

(72) Inventors: Fang-Yi Hsieh, Taipei (TW); Jian-Liang Lin, Yilan County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/268,642

(22) Filed: Sep. 19, 2016

(65) Prior Publication Data

US 2017/0006307 A1 Jan. 5, 2017

Related U.S. Application Data

(63) Continuation of application No. 13/094,787, filed on Apr. 26, 2011, now abandoned.

(51) Int. Cl.
*H04N 19/59* (2014.01)
*H04N 19/159* (2014.01)
(Continued)

(52) U.S. Cl.
CPC ........... *H04N 19/59* (2014.11); *H04N 19/105* (2014.11); *H04N 19/11* (2014.11); *H04N 19/117* (2014.11);
(Continued)

(58) Field of Classification Search
CPC ...... H04N 19/59; H04N 19/43; H04N 19/117; H04N 19/11; H04N 19/105; H04N 19/139;
(Continued)

(56) References Cited

U.S. PATENT DOCUMENTS

| 5,821,986 A | * | 10/1998 | Yuan | H04N 19/59 348/14.08 |
| 6,917,384 B1 | * | 7/2005 | Fukushima | H04N 1/215 348/222.1 |

(Continued)

FOREIGN PATENT DOCUMENTS

| CN | 101485206 A | 7/2009 |
| CN | 102025994 B | 7/2013 |

*Primary Examiner* — Joseph Suh
(74) *Attorney, Agent, or Firm* — Oblon, McClelland, Maier & Neustadt, L.L.P.

(57) ABSTRACT

An apparatus for dynamically adjusting video decoding complexity includes a decoding resolution control circuit and an adaptive spatial resolution decoder. The decoding resolution control circuit is arranged to dynamically determine whether at least one portion of multiple frames should be decoded in accordance with a specific resolution differing from an original resolution of the frames. In addition, the adaptive spatial resolution decoder is arranged to decode the frames according to whether the at least one portion of the frames should be decoded in accordance with the specific resolution. In particular, the apparatus further includes a system capability analyzing circuit arranged to analyze system capability of at least a portion of the apparatus, in order to generate analyzing results for being sent to the decoding resolution control circuit. An associated method is also provided.

16 Claims, 11 Drawing Sheets

(51) Int. Cl.

| | | |
|---|---|---|
| *H04N 19/172* | (2014.01) | |
| *H04N 19/132* | (2014.01) | |
| *H04N 19/152* | (2014.01) | |
| *H04N 19/156* | (2014.01) | |
| *H04N 19/177* | (2014.01) | |
| *H04N 19/44* | (2014.01) | |
| *H04N 19/105* | (2014.01) | |
| *H04N 19/11* | (2014.01) | |
| *H04N 19/117* | (2014.01) | |
| *H04N 19/139* | (2014.01) | |
| *H04N 19/43* | (2014.01) | |

(52) U.S. Cl.
CPC ......... *H04N 19/132* (2014.11); *H04N 19/139* (2014.11); *H04N 19/152* (2014.11); *H04N 19/156* (2014.11); *H04N 19/159* (2014.11); *H04N 19/172* (2014.11); *H04N 19/177* (2014.11); *H04N 19/43* (2014.11); *H04N 19/44* (2014.11)

(58) Field of Classification Search
CPC .. H04N 19/172; H04N 19/159; H04N 19/132; H04N 19/152; H04N 19/156; H04N 19/177; H04N 19/44
See application file for complete search history.

(56) References Cited

U.S. PATENT DOCUMENTS

| | | | | |
|---|---|---|---|---|
| 7,333,662 B2* | 2/2008 | Okada | .................... | H04N 19/70 375/E7.04 |
| 2001/0043751 A1* | 11/2001 | Takahashi | ............... | G06T 9/007 382/240 |
| 2001/0048719 A1* | 12/2001 | Takeuchi | ........... | H04N 21/2368 375/240.15 |
| 2002/0034254 A1* | 3/2002 | Yamada | ............... | H04N 5/4401 375/240.25 |
| 2002/0064226 A1 | 5/2002 | Bauer | | |
| 2002/0159528 A1* | 10/2002 | Graziani | ................ | H04N 19/90 375/240.16 |
| 2002/0181789 A1* | 12/2002 | Okada | .................... | G06T 9/007 382/233 |
| 2002/0196853 A1* | 12/2002 | Liang | ................ | H04N 19/61 375/240.16 |
| 2003/0007566 A1* | 1/2003 | Peng | ................ | H04N 21/25808 375/240.25 |
| 2003/0076655 A1* | 4/2003 | Lien | ..................... | G06F 1/1605 361/679.23 |
| 2003/0210744 A1* | 11/2003 | Porikli | ................ | H04N 19/176 375/240.2 |
| 2004/0031060 A1* | 2/2004 | Kondo | .................... | G06Q 50/188 725/131 |
| 2004/0086189 A1* | 5/2004 | Kondo | .................... | H04N 19/50 382/234 |
| 2004/0158878 A1* | 8/2004 | Ratnakar | ................ | H04N 19/59 725/150 |
| 2004/0170395 A1* | 9/2004 | Filippini | ............... | H04N 19/124 386/356 |
| 2004/0205217 A1* | 10/2004 | Gabrani | ................ | H04N 21/40 709/231 |
| 2004/0233997 A1* | 11/2004 | Umesako | ............. | H04N 5/4401 375/240.26 |
| 2005/0002453 A1* | 1/2005 | Chang | ................ | H04N 21/2402 375/240.03 |
| 2005/0041740 A1* | 2/2005 | Sekiguchi | ............ | H04N 19/139 375/240.16 |
| 2005/0041884 A1* | 2/2005 | Lin | ........................ | A63F 13/005 382/276 |
| 2005/0117647 A1* | 6/2005 | Han | ........................ | H04N 19/63 375/240.16 |
| 2005/0157786 A1* | 7/2005 | Yanagihara | ............ | H04N 19/56 375/240.03 |
| 2005/0163224 A1* | 7/2005 | Shin | ........................ | H04N 19/30 375/240.25 |
| 2006/0033761 A1* | 2/2006 | Suen | ...................... | G06F 3/147 345/660 |
| 2006/0171684 A1* | 8/2006 | Fukuda | ................ | G11B 27/034 386/235 |
| 2006/0256857 A1* | 11/2006 | Chin | .................... | H04N 19/149 375/240.03 |
| 2006/0282874 A1* | 12/2006 | Ito | ........................ | H04N 5/4401 725/139 |
| 2007/0253479 A1* | 11/2007 | Mukherjee | .............. | H03M 7/30 375/240.1 |
| 2008/0008454 A1* | 1/2008 | Umesako | ............. | G11B 27/034 386/336 |
| 2008/0158339 A1* | 7/2008 | Civanlar | ................ | H04N 7/152 348/14.09 |
| 2008/0181298 A1* | 7/2008 | Shi | ................. | H04N 21/234327 375/240.03 |
| 2008/0304567 A1 | 12/2008 | Boyce | | |
| 2009/0313484 A1* | 12/2009 | Millet | ....................... | G06F 1/30 713/300 |
| 2010/0067580 A1* | 3/2010 | Sachdeva | ............. | H04N 19/176 375/240.16 |
| 2011/0051808 A1* | 3/2011 | Quast | ..................... | H04N 7/18 375/240.08 |
| 2011/0142129 A1* | 6/2011 | Kung | ............. | H04N 21/440263 375/240.16 |
| 2011/0235713 A1* | 9/2011 | Hsieh | ............. | H04N 21/234363 375/240.16 |
| 2011/0239078 A1* | 9/2011 | Luby | ............. | H04N 21/23106 714/752 |
| 2012/0195376 A1* | 8/2012 | Wu | ...................... | H04N 19/105 375/240.12 |
| 2013/0077675 A1* | 3/2013 | Rosen | .................... | H04N 19/15 375/240.03 |

* cited by examiner

APPARATUS FOR DYNAMICALLY ADJUSTING VIDEO DECODING COMPLEXITY, AND ASSOCIATED METHOD

CROSS REFERENCE TO RELATED APPLICATION

This is a continuation of U.S. application Ser. No. 13/094,787, filed on Apr. 26, 2011 and incorporated herein by reference.

BACKGROUND

The present invention relates to video decoding, and more particularly, to an apparatus for dynamically adjusting video decoding complexity, and to an associated method.

When an end user is viewing a video program utilizing a home theater system at home, encoded data of the video program is decoded for being displayed on a display panel of the home theater system, and the decoded results of the encoded data can be scaled up or scaled down to meet the size and resolution of the display panel. Typically, a decoding device of the home theater system can decode the encoded data with ease, no matter how complicated the algorithm for decoding the encoded data is, and no matter whether the resolution of the video program is high or not.

It would be very convenient for the end user to own a portable electronic device (e.g., a mobile phone or a personal digital assistant (PDA)) that can be utilized for viewing the same video program anywhere. However, when a research and development (R&D) team of a manufacturer is designing such a portable electronic device, some problems may arise. For example, the decoding capability of the portable electronic device may be insufficient in a situation where the algorithm for decoding the encoded data is too complicated and/or the resolution of the video program is high. In another example, the power consumption may be too high when one or more processing circuits within the portable electronic device operate at the highest operation frequency available. Thus, there is a need for highly efficient and cost effective video decoders, in order to implement the portable electronic device mentioned above.

SUMMARY

It is therefore an objective of the claimed invention to provide an apparatus for dynamically adjusting video decoding complexity, and to provide an associated method, in order to solve the above-mentioned problems.

It is another objective of the claimed invention to provide an apparatus for dynamically adjusting video decoding complexity, and to provide an associated method, in order to reduce the calculation load and the power consumption within a portable electronic device such as that mentioned above.

It is another objective of the claimed invention to provide an apparatus for dynamically adjusting video decoding complexity, and to provide an associated method, in order to reduce complexity of decoding operations by dynamically adjusting decoding complexity of each of a plurality of frames. More particularly, the apparatus can selectively make at least a portion of components/modules/units therein operate in accordance with a resolution differing from that of original frames, in order to dynamically adjust decoding complexity frame by frame.

An exemplary embodiment of an apparatus for dynamically adjusting video decoding complexity comprises a decoding resolution control circuit and an adaptive spatial resolution decoder. The decoding resolution control circuit is arranged to dynamically determine whether at least one portion of a plurality of frames should be decoded by at least one decoding circuit operating in accordance with a specific resolution differing from all of intended resolution of the plurality of frames, without comparing the intended resolution with a display resolution of a display module, wherein the at least one decoding circuit starts decoding encoded frame data of the at least one portion of the plurality of frames before decoded frame data of the at least one portion of the plurality of frames is generated. The single adaptive spatial resolution decoder circuit has the at least one decoding circuit, and is arranged to decode the plurality of frames according to whether the at least one portion of the plurality of frames should be decoded by the at least one decoding circuit operating in accordance with the specific resolution, wherein the single adaptive spatial resolution decoder circuit omits partial information received to be processed by the single adaptive spatial resolution decoder circuit when the at least one portion of the plurality of frames is decoded in accordance with the specific resolution.

An exemplary embodiment of a method for dynamically adjusting video decoding complexity comprises: dynamically determining whether at least one portion of a plurality of frames should be decoded by at least one decoding circuit operating in accordance with a specific resolution differing from all of intended resolution of the plurality of frames, without comparing the intended resolution with a display resolution of a display module, wherein the at least one decoding circuit starts decoding encoded frame data of the at least one portion of the plurality of frames before decoded frame data of the at least one portion of the plurality of frames is generated; and by utilizing a single adaptive spatial resolution decoder circuit comprising the at least one decoding circuit, decoding the plurality of frames according to whether the at least one portion of the plurality of frames should be decoded by the at least one decoding circuit operating in accordance with the specific resolution, wherein the single adaptive spatial resolution decoder circuit omits partial information received to be processed by the single adaptive spatial resolution decoder circuit when the at least one portion of the plurality of frames is decoded in accordance with the specific resolution.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
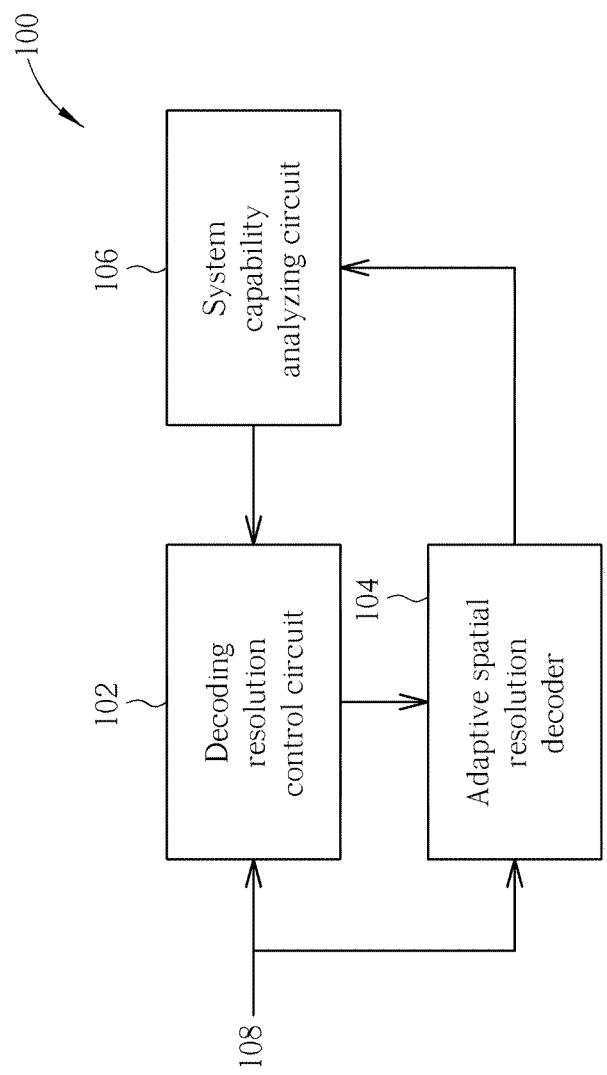
FIG. 1A illustrates an apparatus for dynamically adjusting video decoding complexity according to a first embodiment of the present invention.

Please refer to FIG. 1A, which illustrates an apparatus 100 for dynamically adjusting video decoding complexity according to a first embodiment of the present invention. The apparatus 100 comprises a decoding resolution control circuit 102, an adaptive spatial resolution decoder 104, and a system capability analyzing circuit 106, where the numeral 108 is utilized for representing an input bit stream. According to some embodiments, such as the first embodiment or some variations thereof, the apparatus 100 may represent at least a portion (e.g. a portion or all) of a portable electronic device (e.g. a mobile phone or a personal digital assistant (PDA)). For example, the apparatus 100 may represent the whole of the portable electronic device. In another example, the apparatus 100 may represent a processing circuit of the portable electronic device.

According to the first embodiment, the decoding resolution control circuit 102 is arranged to dynamically determine whether at least one portion of a plurality of frames (and more particularly, at least one frame within the frames carried by the input bit stream 108) should be decoded in accordance with a specific resolution differing from an original resolution of the plurality of frames, in order to dynamically adjust decoding complexity frame by frame. In addition, the adaptive spatial resolution decoder 104 is arranged to decode the plurality of frames (more particularly, the frames carried by the input bit stream 108, which is input into the adaptive spatial resolution decoder 104) according to whether the aforementioned at least one portion of the plurality of frames should be decoded in accordance with the specific resolution. In a situation where the decoding resolution control circuit 102 determines that a frame under consideration should be decoded in accordance with the specific resolution, the adaptive spatial resolution decoder 104 decodes the frame under consideration in accordance with the specific resolution. On the contrary, in a situation where the decoding resolution control circuit 102 determines that a frame under consideration should not be decoded in accordance with the specific resolution, the adaptive spatial resolution decoder 104 decodes the frame under consideration in accordance with the original resolution. Additionally, the system capability analyzing circuit 106 is arranged to analyze system capability of at least a portion of the apparatus 100 (e.g. the adaptive spatial resolution decoder 104 and/or other components/modules within the apparatus 100), in order to generate analyzing results for being sent to the decoding resolution control circuit 102, where the analyzing results are utilized for performing decoding resolution control.

Please note that, in this embodiment, the original resolution mentioned above corresponds to (W*H) pixels per frame, and the specific resolution mentioned above corresponds to (M*N) pixels per frame, where the specific resolution is typically lower than the original resolution. This is for illustrative purposes only, and is not meant to be a limitation of the present invention. According to some variations of this embodiment, the specific resolution can be higher than or equivalent to the original resolution.

Figure 1B:
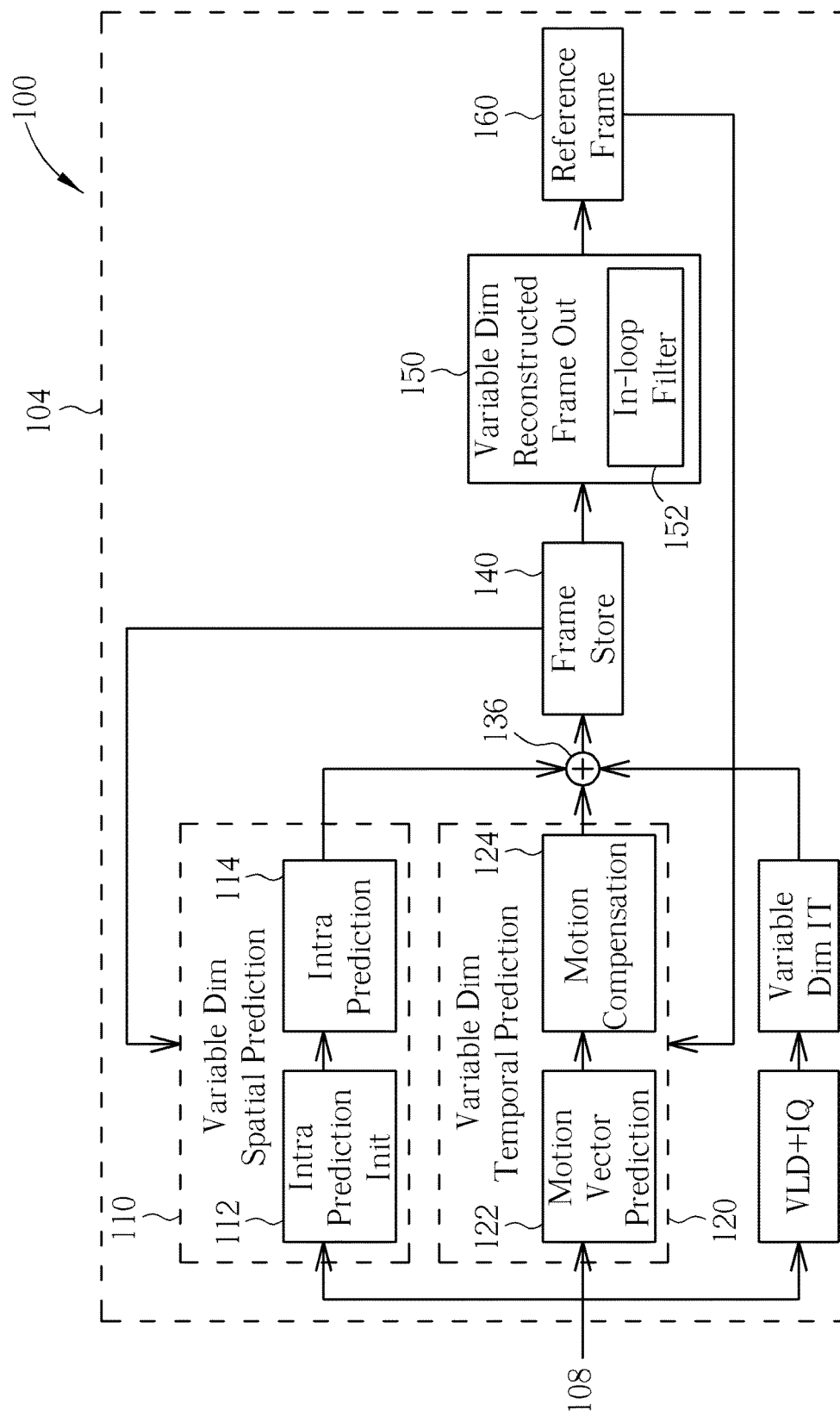
FIG. 1B illustrates some implementation details of the adaptive spatial resolution decoder shown in FIG. 1A according to an embodiment of the present invention.

FIG. 1B illustrates some implementation details of the adaptive spatial resolution decoder 104 shown in FIG. 1A according to an embodiment of the present invention. As shown in FIG. 1B, the adaptive spatial resolution decoder 104 comprises a variable dimension/resolution spatial prediction module 110 (labeled "Variable Dim Spatial Prediction"), a variable dimension temporal prediction module 120 (labeled "Variable Dim Temporal Prediction"), a variable length decoding (VLD) and inverse quantization (IQ) module 132 (labeled "VLD+IQ"), a variable dimension/resolution inverse transform (IT) unit 134 (labeled "Variable Dim IT"), an arithmetic unit such as an adder 136 (labeled "+"), a frame storage 140 (labeled "Frame Store") such as a frame buffer, a variable dimension/resolution reconstructed frame output unit 150 (labeled "Variable Dim Reconstructed Frame Out") comprising a de-blocking filter such as an in-loop filter 152, and a reference frame extraction unit 160 (labeled "Reference Frame"). In addition, the variable dimension/resolution spatial prediction module 110 comprises an intra prediction initial processing unit 112 (labeled "Intra Prediction Init") and an intra prediction unit 114 (labeled "Intra Prediction"), and the variable dimension temporal prediction module 120 comprises a motion vector prediction unit 122 (labeled "Motion Vector Prediction") and a motion compensation unit 124 (labeled "Motion Compensation"). This is for illustrative purposes only, and is not meant to be a limitation of the present invention. According to some variations of this embodiment, the de-blocking filter can be implemented outside the variable dimension/resolution reconstructed frame output unit 150, and more particularly, can be an out-loop filter.

In the embodiment shown in FIG. 1B, the variable dimension/resolution spatial prediction module 110 is arranged to perform spatial prediction according to the input bit stream 108 and/or according to frame data temporarily stored in the frame storage 140, where the intra prediction initial processing unit 112 performs intra prediction initial processing, and the intra prediction unit 114 performs intra prediction operations. The variable dimension temporal prediction module 120 is arranged to perform temporal prediction according to the input bit stream 108 and according to one or more reference frames extracted by the reference frame extraction unit 160, where the motion vector prediction unit 122 performs motion vector prediction, and the motion compensation unit 124 performs motion compensation. In addition, the VLD and IQ module 132 is arranged to perform VLD and IQ operations on the input bit stream 108 to generate inverse quantization results, and the variable dimension/resolution IT unit 134 is arranged to perform IT operations on the inverse quantization results to generate inverse transform results. As shown in FIG. 1B, the aforementioned arithmetic unit such as the adder 136 (labeled "+") is arranged to sum up outputs of the intra prediction unit 114, the motion compensation unit 124, and the variable dimension/resolution IT unit 134 to generate frame data, which can be temporarily stored in the frame storage 140. Additionally, the reconstructed frame output unit 150 is arranged to generate a plurality of reconstructed frames according to frame data temporarily stored in the frame storage 140, where the aforementioned de-blocking filter (e.g. the in-loop filter 152) is arranged to perform de-blocking filtering operations.

According to some variations of this embodiment, at least a portion of the adaptive spatial resolution decoder 104 can omit partial information being processed by the portion of the adaptive spatial resolution decoder 104, in order to reduce complexity of decoding the input bit stream 108.

According to various embodiments, such as the embodiment shown in FIG. 1B and some variations thereof, the decoding resolution control circuit 102 can selectively control at least a portion of components/modules/units within the adaptive spatial resolution decoder 104 to operate in accordance with a resolution differing from the original resolution of any frame carried by the input bit stream 108, in order to dynamically adjust decoding complexity frame by frame. Examples of the components/modules/units may comprise the variable dimension/resolution spatial prediction module 110, the variable dimension temporal prediction module 120, the variable dimension/resolution IT unit 134, and the variable dimension/resolution reconstructed frame output unit 150. As a result, the decoding resolution control circuit 102 can reduce complexity of decoding operations by dynamically adjusting decoding complexity frame by frame.

Figure 2:
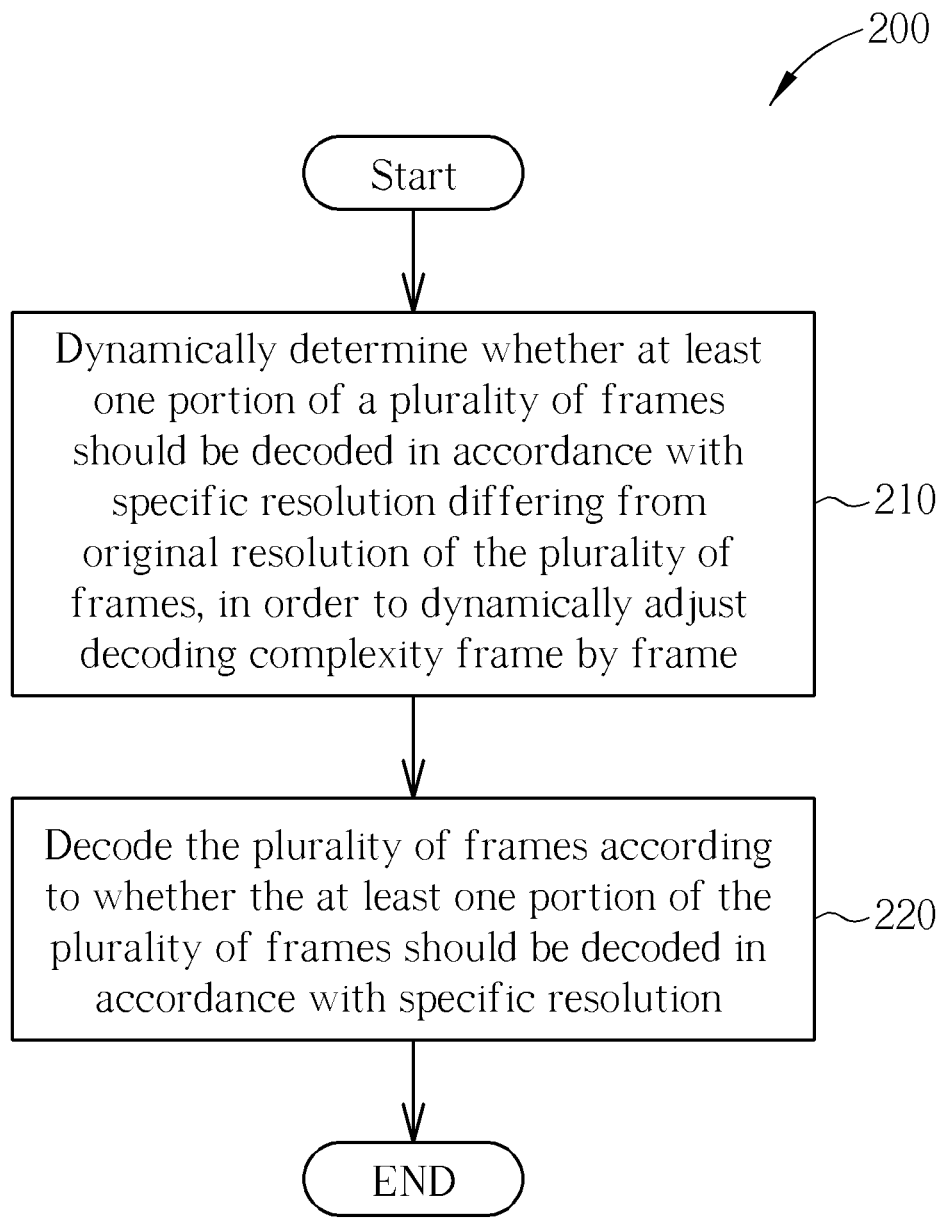
FIG. 2 illustrates a flowchart of a method for dynamically adjusting video decoding complexity according to an embodiment of the present invention.

FIG. 2 illustrates a flowchart of a method 200 for dynamically adjusting video decoding complexity according to an embodiment of the present invention. The method shown in FIG. 2 can be applied to the apparatus 100 shown in FIG. 1A. The method is described as follows.

In Step 210, the decoding resolution control circuit 102 dynamically determines whether at least one portion of a plurality of frames (and more particularly, at least one frame within the aforementioned frames carried by the input bit stream 108) should be decoded in accordance with the specific resolution differing from the original resolution of the plurality of frames, in order to dynamically adjust decoding complexity frame by frame.

In Step 220, the adaptive spatial resolution decoder 104 decodes the plurality of frames according to whether the aforementioned at least one portion of the plurality of frames should be decoded in accordance with the specific resolution. For example, the adaptive spatial resolution decoder 104 decodes at least one frame of the plurality of frames by controlling at least a portion of components/modules/units within the adaptive spatial resolution decoder 104 to operate in accordance with the specific resolution.

In practice, the operations of Step 210 and Step 220 can be performed repeatedly. In addition, at least a portion of the operations of Step 210 and at least a portion of the operations of Step 220 can be performed at the same time. For example, before the decoding resolution control circuit 102 completes the operations of determining whether a current frame should be decoded in accordance with the specific resolution, the adaptive spatial resolution decoder 104 may still be decoding a previous frame. In another example, when the adaptive spatial resolution decoder 104 is decoding the current frame, the decoding resolution control circuit 102 may start the operations of determining whether a next frame should be decoded in accordance with the specific resolution.

According to the embodiment shown in FIG. 2, the system capability analyzing circuit 106 analyzes the system capability of at least a portion of the apparatus 100, in order to generate analyzing results such as those mentioned above, for use of decoding resolution control. Based on the analyzing results, the decoding resolution control circuit 102 dynamically determines whether the aforementioned at least one portion of the plurality of frames should be decoded in accordance with the specific resolution. In some embodiments, such as the embodiment shown in FIG. 2 and some variations thereof, the analyzing results may correspond to power consumption of the apparatus 100, the number of frames in a display buffer within/outside the apparatus 100, the system loading of the apparatus 100, and/or the decoding time of at least one frame (e.g. the average decoding time of some frames, or the overall decoding time of some frames). That is, in these embodiments, the analyzing results may correspond to one or a combination of a portion/all of the power consumption of the apparatus 100, the number of frames in the display buffer within/outside the apparatus 100, the system loading of the apparatus 100, and the decoding time of the aforementioned at least one frame.

According to some embodiments, such as the embodiment shown in FIG. 2 and some variations thereof, the decoding resolution control circuit 102 adaptively controls decoding resolution(s) (and more particularly, the decoding resolution(s) of the aforementioned at least one portion of the plurality of frames) based on the display resolution of a display module (e.g., a liquid crystal display module (LCM)), the system capability of the apparatus 100, the input bit stream 108 carrying the plurality of frames mentioned above, the target frame rate of the frames, the frame type(s) of the frames, and/or the structure of group of picture (GOP), where the display module mentioned above may be positioned within or outside the apparatus 100. That is, in these embodiments, the decoding resolution control circuit 102 adaptively controls the decoding resolution(s) (and more particularly, the decoding resolution(s) of the aforementioned at least one portion of the plurality of frames) based on one or a combination of a portion/all of the display resolution of the display module (e.g., the LCM), the system capability of the apparatus 100, the input bit stream 108 carrying the plurality of frames mentioned above, the target frame rate of the frames, the frame type(s) of the frames, and the structure of GOP.

For example, in a situation where the aforementioned at least one portion of the plurality of frames comprises a non-reference frame, the non-reference frame can be a bi-directional predicted frame (B-frame). In another example, in a situation where the aforementioned at least one portion of the plurality of frames comprises a reference frame, the reference frame can be an intra frame (I-frame), a predicted frame (P-frame), or a reference B-frame.

FIGS. 3A-3H respectively illustrate some video decoding schemes involved with the method 200 shown in FIG. 2 according to different embodiments of the present invention. In at least a portion of these embodiments, the complexity of decoding operations can be reduced by dynamically adjusting decoding complexity of each of the plurality of frames. For example, the decoding resolution control circuit 102 can control some decoding operations, such as those of temporal prediction, spatial prediction, VLD and IQ, IT, motion compensation, reconstruction addition, and de-blocking, to be performed in accordance with the specific resolution mentioned in Step 210. More particularly, for the aforementioned at least one portion of the plurality of frames (e.g. at least one frame within the aforementioned frames carried by the input bit stream 108), the adaptive spatial resolution decoder 104 allows motion compensation reference in an original domain or a down-sampling domain, and allows adaptive adjustment of the decode complexity in accordance with system capability, and further allows decoding complexity change (or change of the reference domain), where down-scaled decoding operations may be applied to I-frames, P-frames, and B-frames, while up-scaled decoding operations may be applied to I-frames, P-frames, and B-frames. In addition, some of the frames may be re-sampled in accordance with a display size (or a display resolution) of a displayer (e.g. the aforementioned display module such as the LCM in some of the embodiments shown in FIGS. 3A-3H) or resized by a resizer within the apparatus 100 (and more particularly, within the adaptive spatial resolution decoder 104).

Figure 3A:
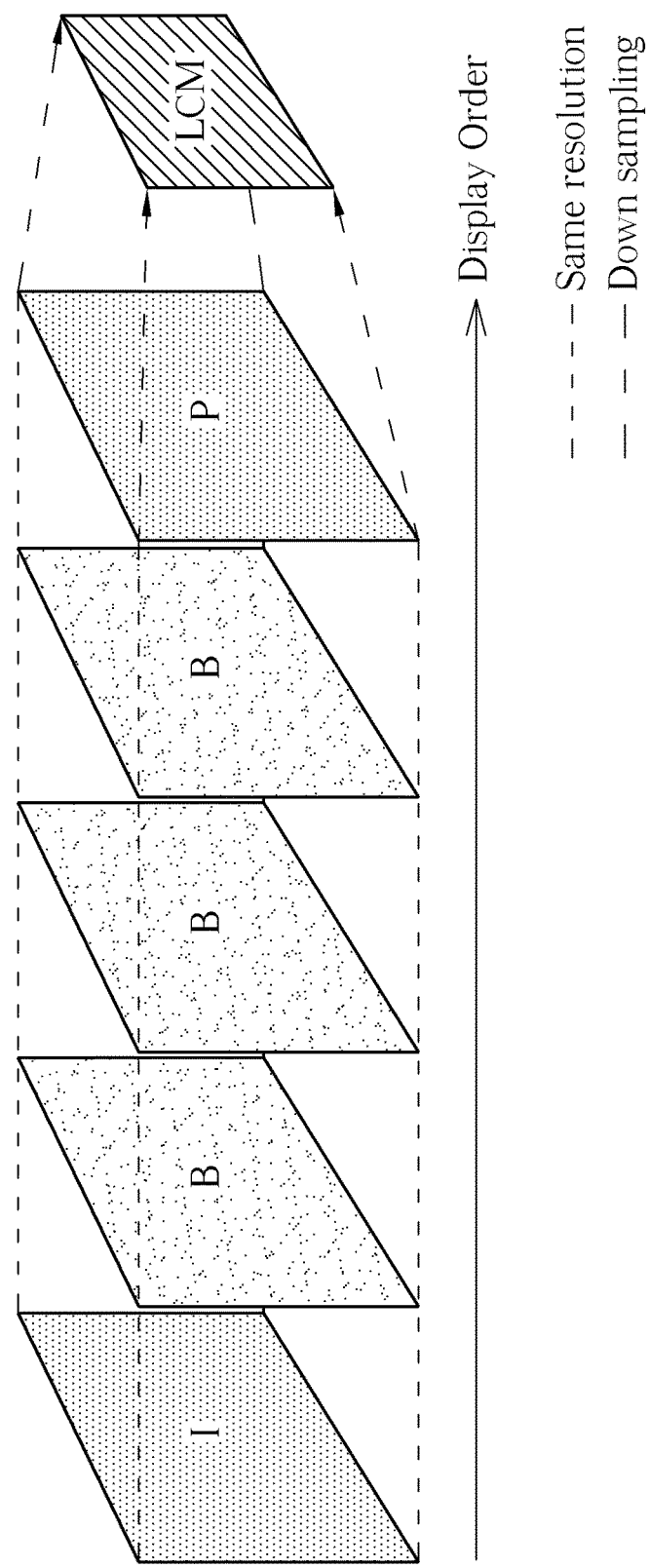
FIGS. 3A-3H respectively illustrate some video decoding schemes involved with the method shown in FIG. 2 according to different embodiments of the present invention.

Referring to FIG. 3A, under control of the decoding resolution control circuit 102, the adaptive spatial resolution decoder 104 decodes an I-frame, three B-frames, and a P-frame (respectively labeled "I", "B", "B", "B", and "P" in FIG. 3A, in the display order) in accordance with the original resolution mentioned in Step 210. Thus, these frames are decoded in accordance with the same resolution. In this embodiment, the resizer mentioned above resizes all of the frames shown in FIG. 3A in accordance with the display size (or the display resolution) of the LCM, and more particularly, performs down sampling operations on the I-frame, the B-frames, and the P-frame, where the video decoding scheme shown in FIG. 3A corresponds to a standard decoder mode of the adaptive spatial resolution decoder 104.

Figure 3B:
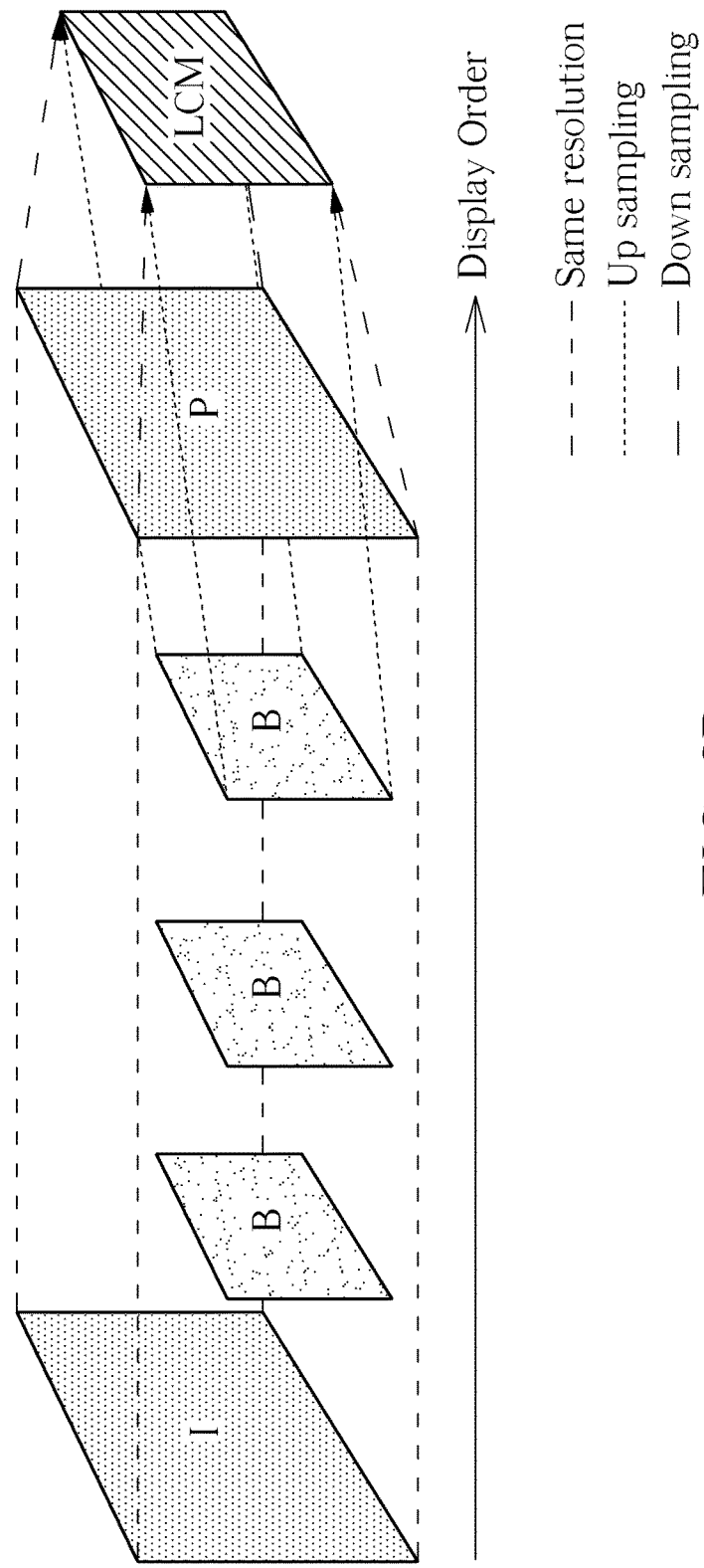

Referring to FIG. 3B, under control of the decoding resolution control circuit 102, the adaptive spatial resolution decoder 104 decodes an I-frame (labeled "I" in FIG. 3B) in accordance with the original resolution mentioned in Step 210, and decodes three B-frames (respectively labeled "B", "B", and "B" in FIG. 3B, in the display order) in accordance with the specific resolution mentioned in Step 210, and decodes a P-frame (labeled "P" in FIG. 3B) in accordance with the original resolution mentioned in Step 210, where the specific resolution of this embodiment is lower than the display resolution of the LCM. According to this embodiment, the three B-frames are decoded with low complexity, and therefore, can be referred to as low complexity B-frames. For example, the low complexity B-frames can be lossy. In another example, the low complexity B-frames can be lossless. In this embodiment, the resizer mentioned above resizes all of the frames shown in FIG. 3B in accordance with the display size (or the display resolution) of the LCM, and more particularly, performs down sampling operations on the I-frame and the P-frame and performs up sampling operations on the B-frames, where the video decoding scheme shown in FIG. 3B corresponds to a low complexity B-frame mode of the adaptive spatial resolution decoder 104.

Figure 3C:
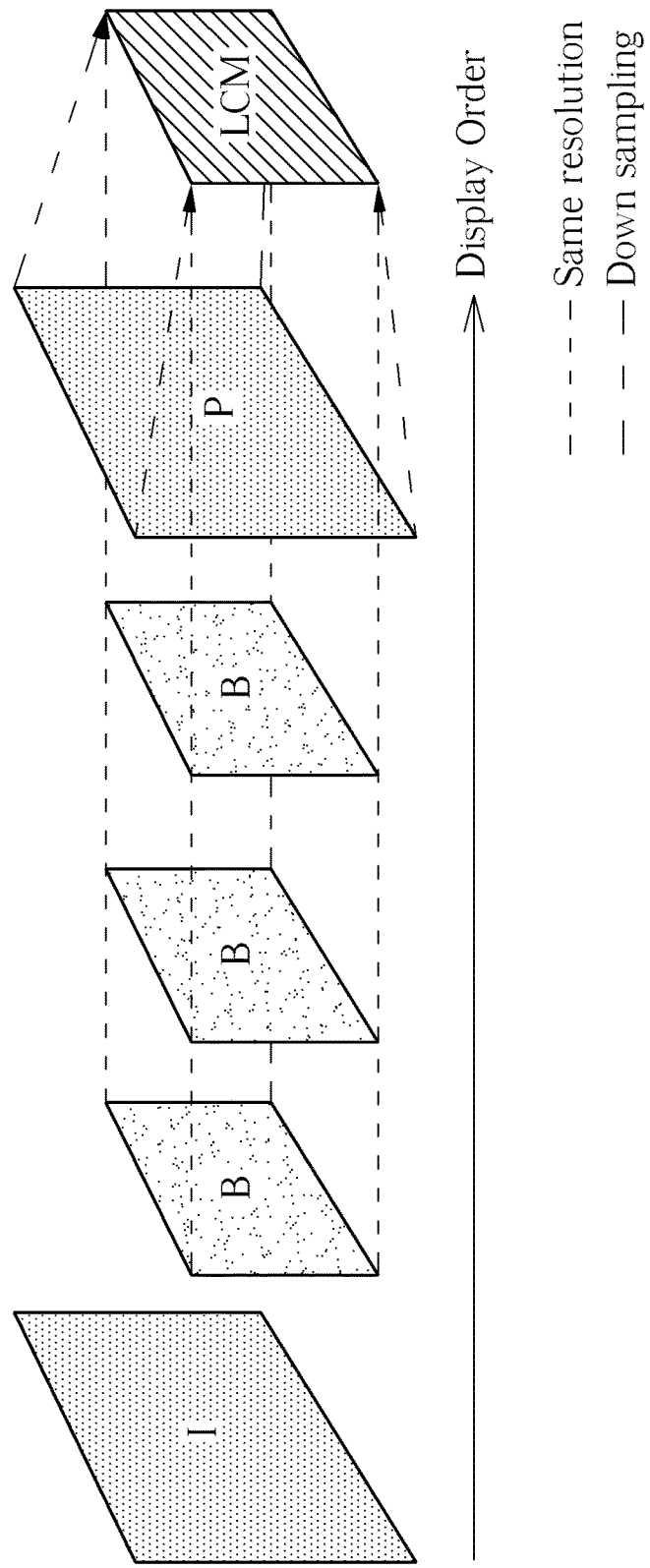

Referring to FIG. 3C, under control of the decoding resolution control circuit 102, the adaptive spatial resolution decoder 104 decodes an I-frame (labeled "I" in FIG. 3C) in accordance with the original resolution mentioned in Step 210, and decodes three B-frames (respectively labeled "B", "B", and "B" in FIG. 3C, in the display order) in accordance with the specific resolution mentioned in Step 210, and decodes a P-frame (labeled "P" in FIG. 3C) in accordance with the original resolution mentioned in Step 210, where the specific resolution of this embodiment is equivalent to the display resolution of the LCM. According to this embodiment, the three B-frames are decoded with low complexity, and therefore, can be referred to as low complexity B-frames. For example, the low complexity B-frames can be lossy. In another example, the low complexity B-frames can be lossless. In this embodiment, the resizer mentioned above resizes some of the frames shown in FIG. 3C in accordance with the display size (or the display resolution) of the LCM, and more particularly, performs down sampling operations on the I-frame and the P-frame, where the video decoding scheme shown in FIG. 3C corresponds to a low complexity B-frame mode of the adaptive spatial resolution decoder 104.

Regarding the low complexity B-frame mode of any of the embodiments respectively shown in FIG. 3B and FIG. 3C, for a non-reference frame such as any B-frame mentioned in these embodiments (i.e. any of the low complexity B-frames), the decoding resolution control circuit 102 adaptively controls the decoding resolution(s) based on the display resolution of the display module mentioned above (e.g. the LCM in any of the embodiments shown in FIGS. 3B-3C), the system capability of the apparatus 100, the input bit stream 108 carrying the plurality of frames mentioned above, the target frame rate of these frames, the frame type(s) of these frames, and/or the structure of GOP. For example, the decoding resolution control circuit 102 parses the input bit stream 108 and controls the adaptive spatial resolution decoder 104 to decode and reconstruct partial images, in order to generate the low complexity B-frames. In a situation where the specific resolution of this embodiment is equivalent to the display resolution of the LCM, the low complexity B-frames can be displayed directly.

Figure 3D:
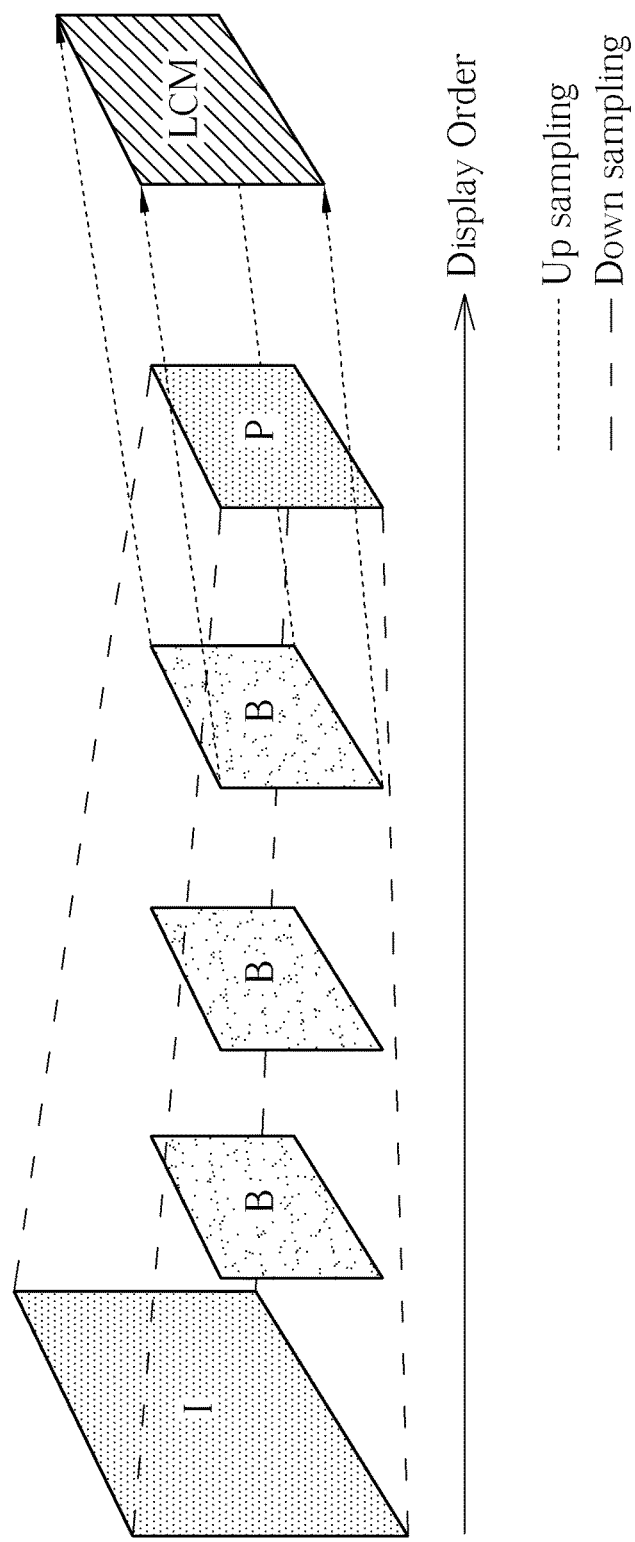

Referring to FIG. 3D, under control of the decoding resolution control circuit 102, the adaptive spatial resolution decoder 104 decodes an I-frame (labeled "I" in FIG. 3D) in accordance with the original resolution mentioned in Step 210, and decodes three B-frames and a P-frame (respectively labeled "B", "B", "B" and "P" in FIG. 3D, in the display order) in accordance with the specific resolution mentioned in Step 210, where the specific resolution of this embodiment is lower than the display resolution of the LCM. According to this embodiment, the three B-frames and the P-frame are decoded with low complexity, and therefore, can be referred to as low complexity B/P-frames, respectively. For example, the low complexity B/P-frames can be lossy. In another example, the low complexity B/P-frames can be lossless. In this embodiment, the resizer mentioned above resizes all of the frames shown in FIG. 3D in accordance with the display size (or the display resolution) of the LCM, and more particularly, performs a down sampling operation on the I-frame and performs up sampling operations on the B-frames and the P-frame, where the video decoding scheme shown in FIG. 3D corresponds to a low complexity P/B-frame mode of the adaptive spatial resolution decoder 104.

Figure 3E:
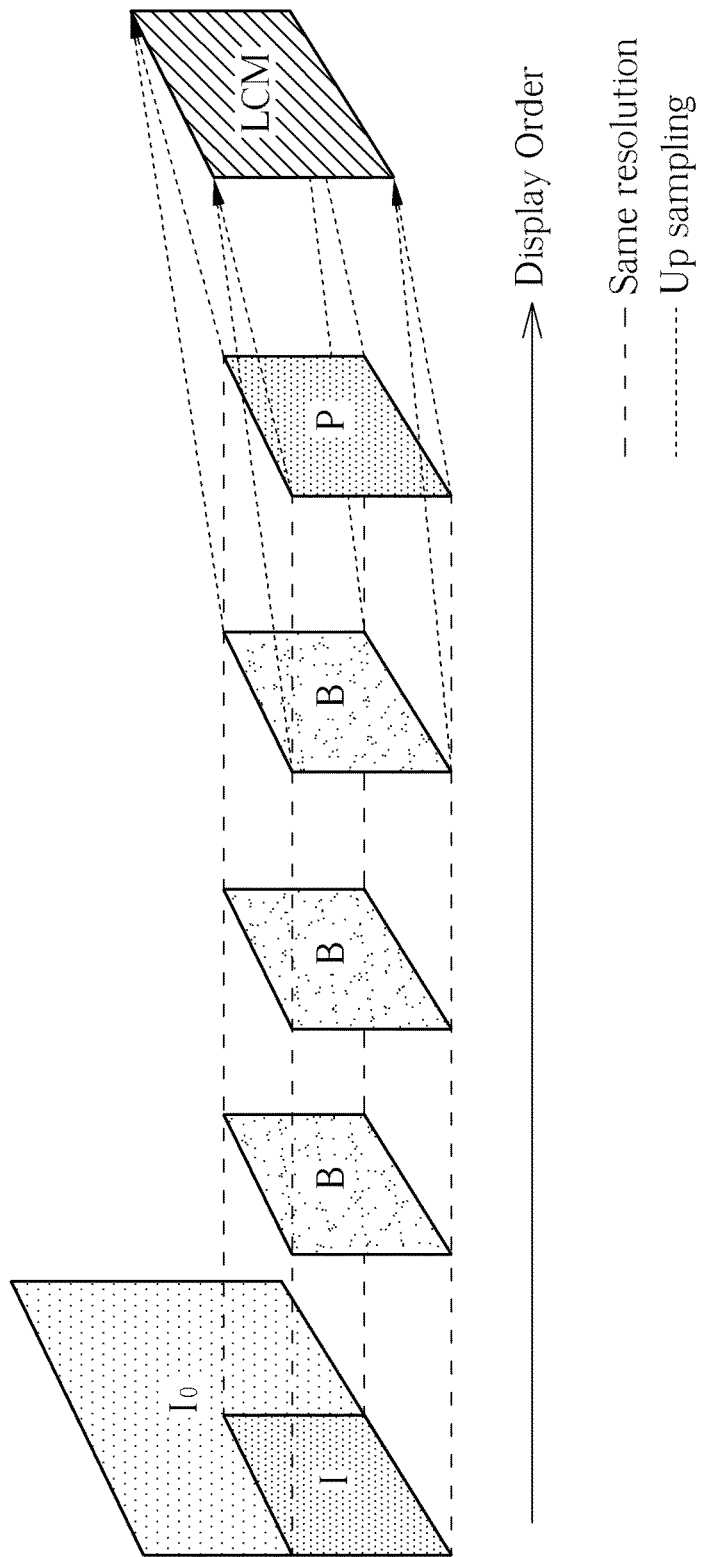

Referring to FIG. 3E, under control of the decoding resolution control circuit 102, the adaptive spatial resolution decoder 104 decodes an I-frame, three B-frames, and a P-frame (respectively labeled "I", "B", "B", "B" and "P" in FIG. 3E, in the display order) in accordance with the specific resolution mentioned in Step 210, where the original resolution such as that of the original I-frame (labeled "$I_0$", for comparison purposes only) is higher than the display resolution of the LCM, and the specific resolution of this embodiment is lower than the display resolution of the LCM. According to this embodiment, the I-frame (labeled "I"), the three B-frames, and the P-frame are all decoded with low complexity, and therefore, can be referred to as low complexity I/B/P-frames, respectively. For example, the low complexity B/P-frames can be lossy. In another example, the low complexity B/P-frames can be lossless. In this embodiment, the resizer mentioned above resizes the frames (e.g. those respectively labeled "I", "B", and "P" in FIG. 3E) in accordance with the display size (or the display resolution) of the LCM, and more particularly, performs up sampling operations on the I-frame (labeled "I"), the B-frames, and the P-frame, where the video decoding scheme shown in FIG. 3E corresponds to a low complexity flow mode of the adaptive spatial resolution decoder 104.

Figure 3F:
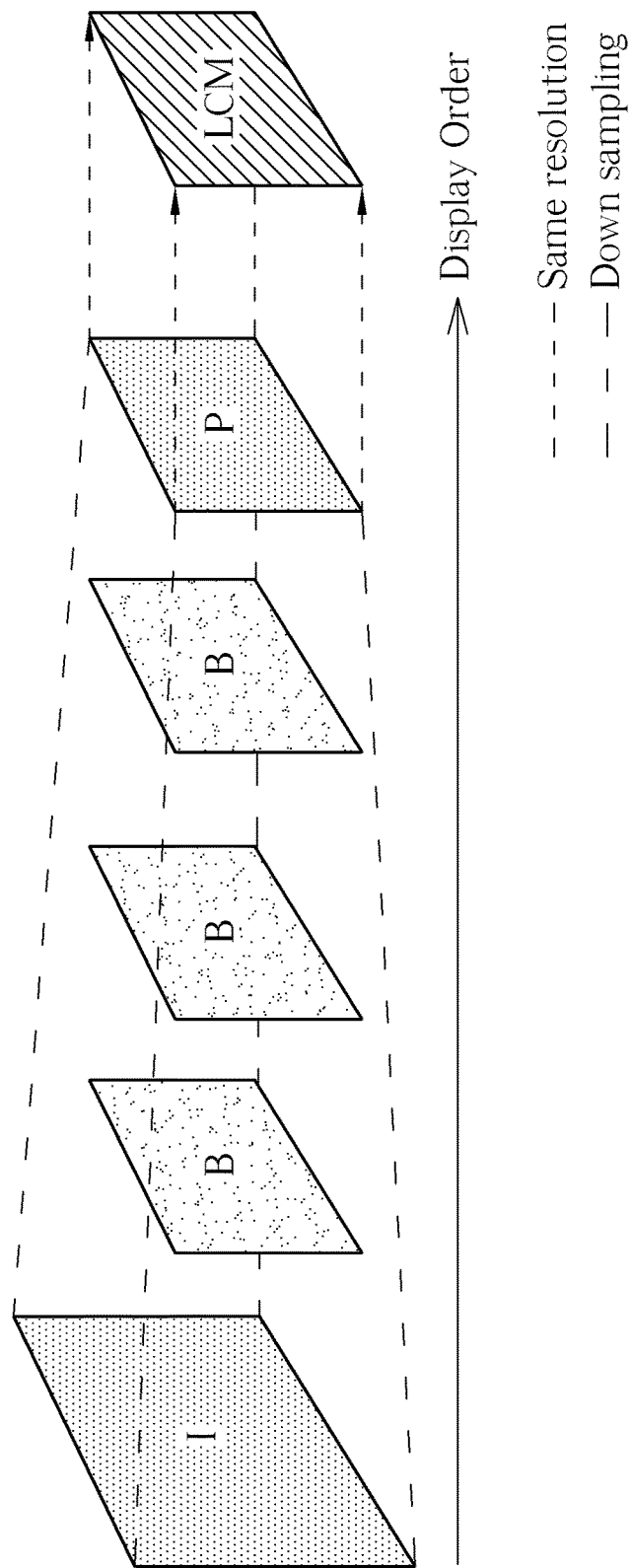

Referring to FIG. 3F, under control of the decoding resolution control circuit 102, the adaptive spatial resolution decoder 104 decodes an I-frame (labeled "I" in FIG. 3F) in accordance with the original resolution mentioned in Step 210, and decodes three B-frames and a P-frame (respectively labeled "B", "B", "B" and "P" in FIG. 3F, in the display order) in accordance with the specific resolution mentioned in Step 210, where the specific resolution of this embodiment is equivalent to the display resolution of the LCM. According to this embodiment, the three B-frames and the P-frame are decoded with low complexity, and therefore, can be referred to as low complexity B/P-frames, respectively. For example, the low complexity B/P-frames can be lossy. In another example, the low complexity B/P-frames can be lossless. In this embodiment, the resizer mentioned above resizes at least one frame of the frames shown in FIG. 3F in accordance with the display size (or the display resolution) of the LCM, and more particularly, performs a down sampling operation on the I-frame, where the video decoding scheme shown in FIG. 3F corresponds to a low complexity P/B-frame mode of the adaptive spatial resolution decoder 104.

Figure 3G:
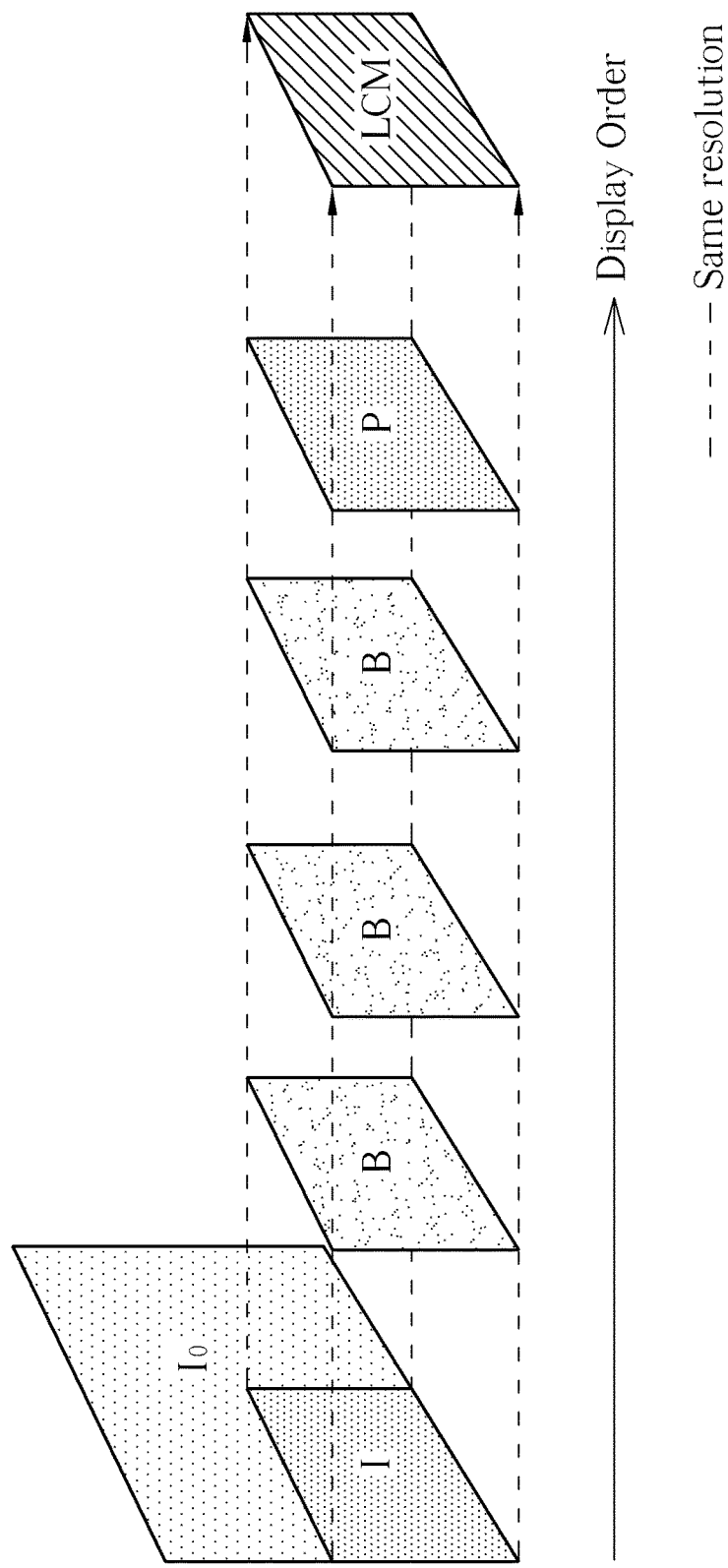

Referring to FIG. 3G, under control of the decoding resolution control circuit 102, the adaptive spatial resolution decoder 104 decodes an I-frame, three B-frames, and a P-frame (respectively labeled "I", "B", "B", "B" and "P" in FIG. 3G, in the display order) in accordance with the specific resolution mentioned in Step 210, where the original resolution such as that of the original I-frame (labeled "$I_O$", for comparison purposes only) is higher than the display resolution of the LCM, and the specific resolution of this embodiment is equivalent to the display resolution of the LCM. According to this embodiment, the I-frame (labeled "I"), the three B-frames, and the P-frame are all decoded with low complexity, and therefore, can be referred to as low complexity I/B/P-frames, respectively. For example, the low complexity B/P-frames can be lossy. In another example, the low complexity B/P-frames can be lossless. In this embodiment, it is unnecessary to resize the frames (e.g. those respectively labeled "I", "B", and "P" in FIG. 3G) in accordance with the display size (or the display resolution) of the LCM, and therefore, performing up/down sampling operations is not required, where the video decoding scheme shown in FIG. 3G corresponds to a low complexity flow mode of the adaptive spatial resolution decoder 104.

Figure 3H:
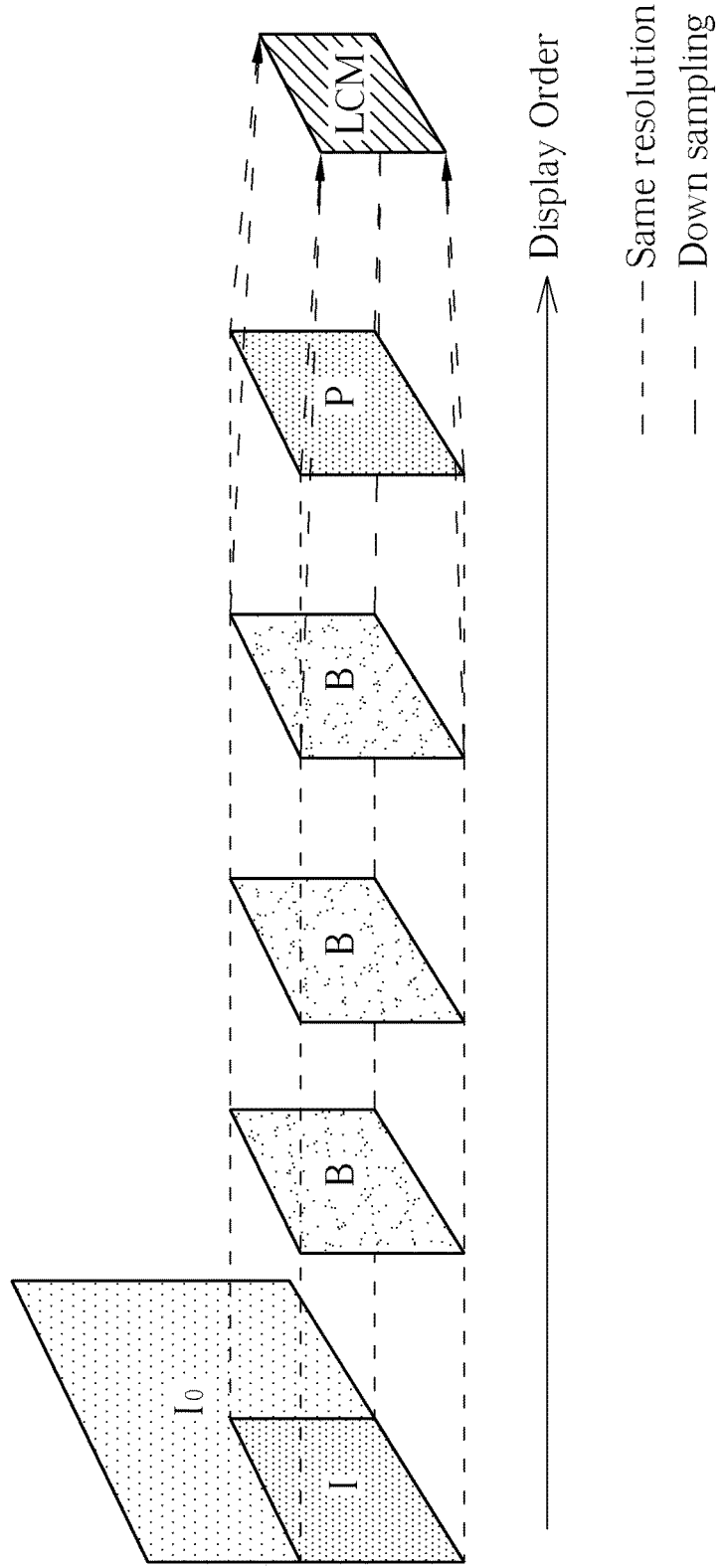

Referring to FIG. 3H, under control of the decoding resolution control circuit 102, the adaptive spatial resolution decoder 104 decodes an I-frame, three B-frames, and a P-frame (respectively labeled "I", "B", "B", "B" and "P" in FIG. 3H, in the display order) in accordance with the specific resolution mentioned in Step 210, where the original resolution such as that of the original I-frame (labeled "$I_O$", for comparison purposes only) is higher than the display resolution of the LCM, and the specific resolution of this embodiment is higher than the display resolution of the LCM. According to this embodiment, the I-frame (labeled "I"), the three B-frames, and the P-frame are all decoded with low complexity, and therefore, can be referred to as low complexity I/B/P-frames, respectively. For example, the low complexity B/P-frames can be lossy. In another example, the low complexity B/P-frames can be lossless. In this embodiment, the resizer mentioned above resizes the frames (e.g. those respectively labeled "I", "B", and "P" in FIG. 3H) in accordance with the display size (or the display resolution) of the LCM, and more particularly, performs down sampling operations on the I-frame (labeled "I"), the B-frames, and the P-frame, where the video decoding scheme shown in FIG. 3H corresponds to a low complexity flow mode of the adaptive spatial resolution decoder 104.

Regarding the low complexity P/B-frame mode of any of the embodiments respectively shown in FIG. 3D and FIG. 3F and the low complexity flow mode of any of the embodiments respectively shown in FIG. 3E, FIG. 3G, and FIG. 3H, for a reference frame such as any I-frame (labeled "I") mentioned in the embodiments shown in FIG. 3E, FIG. 3G, and FIG. 3H, any reference B-frame within the B-frames mentioned in the embodiments shown in FIGS. 3D-3H (i.e. any reference B-frame within the low complexity B-frames), and any P-frame mentioned in the embodiments shown in FIGS. 3D-3H (i.e. any of the low complexity P-frames), the decoding resolution control circuit 102 adaptively controls the decoding resolution(s) based on the display resolution of the display module mentioned above (e.g. the LCM in any of the embodiments shown in FIGS. 3D-3H), the system capability of the apparatus 100, the input bit stream 108 carrying the plurality of frames mentioned above, the target frame rate of these frames, the frame type(s) of these frames, and/or the structure of GOP. For example, the decoding resolution control circuit 102 parses the input bit stream 108 and controls the adaptive spatial resolution decoder 104 to decode and reconstruct partial images, in order to generate the low complexity I/P/B-frames. More particularly, for some following frames (based on the decoding order), the adaptive spatial resolution decoder 104 performs motion compensation based on the reconstructed partial images in accordance with the specific resolution, rather than the original resolution. In a situation where the specific resolution of this embodiment is equivalent to the display resolution of the LCM, the low complexity I/P/B-frames can be displayed directly.

In practice, when controlling the adaptive spatial resolution decoder 104 to partially reconstruct a frame, the decoding resolution control circuit 102 can adaptively controls at least a portion of components/modules/units within the adaptive spatial resolution decoder 104 to operate in accordance with a resolution differing from that of original frames, in order to reduce the complexity and to reduce memory usage and power consumption. For example, the variable dimension/resolution spatial prediction module 110 can generate a partial image during intra prediction, the variable dimension temporal prediction module 120 can generate a partial image in motion compensation during inter prediction, an IQ and IT module (which may comprise at least a portion of the VLD and IQ module 132 and comprise the variable dimension/resolution IT unit 134) can output a partial reconstructed residual image during IQ and IT operations, the frame storage 140 can store a partial image, and the aforementioned de-blocking filter (e.g. the in-loop filter 152) can filter a partial image, where partial information may be decoded during entropy decoding.

It is an advantage of the present invention that the present invention method and apparatus can reduce complexity of decoding operations by dynamically adjusting decoding complexity of at least a portion of frames. As a result, the calculation load and the power consumption within a portable electronic device such as that mentioned above can be reduced, where the related art problems (e.g. insufficient decoding capability and high power consumption) will no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for dynamically adjusting video decoding complexity, the apparatus comprising:
   a decoding resolution control circuit configured to dynamically determine, based on system capability of the apparatus and a target frame rate of a plurality of frames, whether at least one portion of the plurality of frames is to be decoded in accordance with a predetermined resolution differing from any intended resolution of the plurality of frames; and
   an adaptive spatial resolution decoder circuit configured to decode the at least one portion of the plurality of frames according to the predetermined resolution by partially omitting encoded data of the at least one portion of the plurality of frames.

2. The apparatus of claim 1, wherein the at least one portion of the plurality of frames comprises a non-reference frame.

3. The apparatus of claim 2, wherein the adaptive spatial resolution decoder circuit is configured to decode the non-reference frame by controlling the adaptive spatial resolution decoder circuit to operate in accordance with the predetermined resolution.

4. The apparatus of claim 2, wherein the non-reference frame is a bi-directional predicted frame (B-frame).

5. The apparatus of claim 1, wherein the at least one portion of the plurality of frames comprises a reference frame.

6. The apparatus of claim 5, wherein the reference frame is an intra frame (I-frame), a predicted frame (P-frame), or a reference bi-directional predicted frame (B-frame).

7. The apparatus of claim 1, further comprising:
   a system capability analyzing circuit configured to analyze the system capability of the apparatus, and to generate analyzing results indicating the system capacity for being sent to the decoding resolution control circuit, wherein the analyzing results correspond to one or a combination of a portion or all of a number of frames in a display buffer, system loading, and a decoding time of a frame.

8. The apparatus of claim 7, wherein the analyzing results further correspond to power consumption.

9. A method for dynamically adjusting video decoding complexity, the method comprising:
   dynamically determining, by circuitry of an apparatus based on system capability of the apparatus and a target frame rate of a plurality of frames, whether at least one portion of the plurality of frames is to be decoded in accordance with a predetermined resolution differing from any intended resolution of the plurality of frames; and
   decoding, by an adaptive spatial resolution decoder circuit of the apparatus, the at least one portion of the plurality of frames according to the predetermined resolution by partially omitting encoded data of the at least one portion of the plurality of frames.

10. The method of claim 9, wherein the at least one portion of the plurality of frames comprises a non-reference frame.

11. The method of claim 10, wherein the decoding the plurality of frames further comprises:
   decoding the non-reference frame by controlling the adaptive spatial resolution decoder circuit to operate in accordance with the predetermined resolution.

12. The method of claim 10, wherein the non-reference frame is a bi-directional predicted frame (B-frame).

13. The method of claim 9, wherein the at least one portion of the plurality of frames comprises a reference frame.

14. The method of claim 13, wherein the reference frame is an intra frame (I-frame), a predicted frame (P-frame), or a reference bi-directional predicted frame (B-frame).

15. The method of claim 9, further comprising:
   analyzing the system capability, and generating analyzing results indicating the system capacity, wherein the analyzing results correspond to one or a combination of a portion or all of a number of frames in a display buffer, system loading, and a decoding time of a frame.

16. The method of claim 15, wherein the analyzing results further correspond to power consumption.

* * * * *